(12) United States Patent
Keita et al.

(10) Patent No.: US 7,820,085 B2
(45) Date of Patent: Oct. 26, 2010

(54) METHODS RELATING TO MOLDING OPTICAL LENSES

(75) Inventors: Gabriel Keita, Clearwater, FL (US); Joseph Boryslawski, St. Petersburg, FL (US)

(73) Assignee: Essilor International, Charenton-le-Pont (FR)

( * ) Notice: Subject to any disclaimer, the term of this patent is extended or adjusted under 35 U.S.C. 154(b) by 1485 days.

(21) Appl. No.: 10/696,503

(22) Filed: Oct. 29, 2003

(65) Prior Publication Data
US 2005/0093187 A1    May 5, 2005

(51) Int. Cl.
*B29C 35/00* (2006.01)
*B29D 11/00* (2006.01)

(52) U.S. Cl. .......... 264/40.1; 73/40.7; 141/113; 264/2.5; 264/319

(58) Field of Classification Search .......... 264/132, 264/1.1, 496, 2.5, 2.7, 40.1, 319; 73/40.7; 425/2; 141/113
See application file for complete search history.

(56) References Cited

U.S. PATENT DOCUMENTS

| | | | | |
|---|---|---|---|---|
| 2,723,554 | A | | 11/1955 | Berlin et al. |
| 3,355,932 | A | * | 12/1967 | Mulligan .................. 73/49.3 |
| 4,440,918 | A | * | 4/1984 | Rice et al. .................. 526/246 |
| 4,534,208 | A | * | 8/1985 | Macin et al. ................ 73/49.3 |
| 4,950,289 | A | * | 8/1990 | Krasner .................... 623/6.13 |
| 5,078,144 | A | * | 1/1992 | Sekino et al. .............. 600/439 |
| 5,110,514 | A | | 5/1992 | Soane ........................ 264/22 |
| 5,274,502 | A | * | 12/1993 | Demerritt et al. ........... 359/642 |
| 5,547,618 | A | | 8/1996 | Magne ....................... 264/1.36 |
| 5,662,839 | A | | 9/1997 | Magne ....................... 264/1.38 |
| 5,741,831 | A | | 4/1998 | Keita et al. ................. 523/106 |
| 5,973,098 | A | | 10/1999 | Keita et al. .................. 528/65 |
| 6,099,763 | A | * | 8/2000 | Su et al. ..................... 264/2.2 |
| 6,103,148 | A | * | 8/2000 | Su et al. .................... 264/1.38 |
| 6,416,689 | B1 | * | 7/2002 | Keita et al. .................. 264/1.1 |
| 6,733,701 | B2 | * | 5/2004 | Gross et al. .................. 264/2.5 |
| 6,843,940 | B2 | * | 1/2005 | Reed et al. ................... 264/2.2 |
| 6,936,197 | B1 | * | 8/2005 | Wires ....................... 264/1.38 |
| 2002/0047220 | A1 | * | 4/2002 | Su ............................. 264/2.2 |
| 2003/0052423 | A1 | * | 3/2003 | Gross et al. ................. 264/1.32 |
| 2003/0125410 | A1 | | 7/2003 | Keita et al. ................. 523/106 |
| 2003/0214060 | A1 | * | 11/2003 | Wires ......................... 264/2.5 |
| 2004/0021238 | A1 | * | 2/2004 | Reed et al. ................... 264/2.2 |
| 2004/0131849 | A1 | * | 7/2004 | Wires ......................... 428/375 |

FOREIGN PATENT DOCUMENTS

| | | |
|---|---|---|
| EP | 0 768 169 | 4/1997 |
| JP | 10-146846 | 6/1998 |
| WO | WO 98/36868 | 8/1998 |

\* cited by examiner

*Primary Examiner*—Mathieu D. Vargot
(74) *Attorney, Agent, or Firm*—Fulbright & Jaworski L.L.P.

(57) ABSTRACT

A method that includes providing a cavity defined by at least a portion of a mold and a closure member attached to the portion of the mold, the portion of the mold being oriented vertically and having a top and a bottom, and a sealing material being positioned near the bottom and attached to the closure member; puncturing the sealing material and the closure member with an instrument near the bottom, the puncturing creating an opening in the sealing material; and introducing a polymerizable composition into the cavity through the instrument. A method useful in testing sealing materials. Other methods are also disclosed.

27 Claims, 4 Drawing Sheets

FIG. 4

METHODS RELATING TO MOLDING OPTICAL LENSES

BACKGROUND OF THE INVENTION

1. Field of the Invention

The invention relates to testing materials for possible use during the molding of optical lenses. The invention also relates to molding optical lenses, particularly ophthalmic lenses, from polymerizable compositions.

2. Description of Related Art

The traditional mold comprises a molding cavity defined by two mold pieces, each typically made of mineral glasses, and an annular closure member, such as a gasket or an adhesive tape, disposed around the periphery of the two mold pieces and attached to them. The conventional way to fill such a two-piece mold is by causing the molding material to flow into the molding cavity through a casting opening provided for this purpose in the closure member. In at least a partly automated process, the molding cavity to be filled is vertically aligned with a filling device that is adapted to deliver a particular quantity of molding material through a nozzle.

One way to fill such a vertically oriented mold is by filling the molding cavity through a nozzle disposed at the top of the mold periphery, which nozzle introduces molding material into the molding cavity by gravity only. See, for example, U.S. Pat. No. 5,110,514. Experience has shown that in the case of a relatively long waiting time (for example, on the order of two hours) between filling the mold and starting polymerization, unless special measures are implemented, the optical lenses obtained frequently have localized optical defects of greater or lesser severity, which leads to relatively high reject rates.

To overcome such problems, U.S. Pat. Nos. 5,547,618 and 5,662,839 propose filling the molding cavity of a vertically oriented two-piece mold through a casting opening formed in a lower part of the closure member and using a pumping mechanism adapted to cause the molding material to flow without significantly pressurizing it. Typically, filling of the molding cavity in this manner is effected using a pipe connected to a pressurized molding material reservoir and applied, like a filling nozzle, to the casting opening. With such a method, it is possible to start polymerization immediately after filling. However, in the case of molding material that reacts at room temperature in less than ten minutes, such as the formulations disclosed in U.S. Pat. No. 5,973,098, the pipe will quickly clog.

One solution to this problem involves the use of a check valve provided in the closure member as disclosed in U.S. patent application Ser. No. 09/814,318, the inventors of which are Gabriel Keita and Yassin Yusef Turshani. While use of a check valve, which may be a duck bill valve as disclosed in the referenced application, addresses the aforementioned clogging problem, use of such valves may be expensive.

Another way of filling a vertically oriented mold is disclosed in Japanese Patent Application No. 8-308223 (Unexamined Japanese Patent 10-146846). The Japanese application discloses molding cavity A defined by two molding pieces 1 and annular closure member comprising adhesive tape 2. An elastic body with a rubber-like elasticity 3 is attached to the adhesive tape at the top of the vertically oriented mold. As an alternative to the elastic body 3, the Japanese application also discloses a coating 4 that has a rubber-like elasticity. The Japanese application discloses introducing molding material into the cavity A through an injection needle placed through both the elastic body 3 or coating 4 and the adhesive tape 2 while using an exhaust tube placed into the molding cavity A through another opening in the elastic body 3 or coating 4 and the adhesive tape 2. The Japanese application discloses withdrawing the nozzle and the exhaust tube after filling the cavity A with the molding material. The Japanese application notes that two holes formed by the introduction of the nozzle (an example of which is an injection needle) and the exhaust tube are closed after those items are removed by virtue of the rubber-like elasticity of elastic body 3 or coating 4. Next, the molding material is cured in a heating furnace for about 10 to 15 hours at about 100° C. The filling method disclosed in the Japanese application is not confronted with, and therefore does not address, the problem of molding material leaking out of the molding cavity A around the injection needle or exhaust tube. This follows because those two instruments enter cavity A from the top of the vertically oriented mold. In addition, problems with encountering localized optical defects due, for example, to microbubbles that form in the molding material as it fills up cavity A may be present with the method disclosed in the Japanese application unless special measures are implemented.

SUMMARY OF THE INVENTION

We provide methods and compositions that may be used to mold optical lenses, especially ophthalmic lenses, in a fast and cost-efficient manner. In one such method, a cavity is provided that is defined by at least a portion of a mold and by a closure member attached to the portion of the mold. The mold is oriented vertically and has a top and a bottom. A sealing material is positioned near the bottom and attached to the closure member. This method also includes puncturing the sealing material and the closure member with an instrument near the bottom. The puncturing creates an opening in the sealing material. This method further includes introducing a polymerizable composition into the cavity through the instrument. Through the use of suitable sealing materials in connection with this and other disclosed methods, the expense of a check or other similar valve may be avoided because such sealing materials tend to conform well to the outside of the instrument used to introduce the polymerizable composition. Further, once the puncturing instrument is removed, such sealing materials tend to minimize (or even eliminate) the size of the opening that is created as a result of the puncture, thereby minimizing (or even eliminating) the formation of microbubbles within the polymerizable composition.

We also provide methods for evaluating the self-sealing nature of various materials, in order to determine if those materials are suited for use as sealing materials in, for example, the method described above. In one such method, a cavity is provided that has at least one opening over which a piece of sealing material is positioned. The cavity contains (but is not necessarily filled with) liquid. The method also includes puncturing the piece of sealing material with an instrument, thereby creating a sealing material opening for a period of time; applying a vacuum to the cavity; and noting a cavity pressure approximately when a first bubble forms around gas entering the liquid through the sealing material opening. The lower the cavity pressure noted, the better, or more well-suited, the tested material is for use as a sealing material in, for example, the method described above.

BRIEF DESCRIPTION OF THE DRAWINGS

The following drawings demonstrate certain, but not necessarily all, aspects of the present methods and compositions.

The drawings illustrate by way of example and not limitation, and they use like references to indicate similar elements.

DESCRIPTION OF ILLUSTRATIVE EMBODIMENTS

The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. As a result, a method, or a step in a method, that "comprises," "has," "contains," or "includes" one or more steps or elements possesses those one or more steps or elements, but is not limited to possessing only those one or more steps or elements.

Thus, and by way of example, a method "comprising" providing a cavity defined by at least a portion of a mold and a closure member attached to the portion of the mold, the portion of the mold being oriented vertically and having a top and a bottom, and a sealing material being positioned near the bottom and attached to the closure member; puncturing the sealing material and the closure member with an instrument near the bottom, the puncturing creating an opening in the sealing material; and introducing a polymerizable composition into the cavity through the instrument, has, but is not limited to having only, the recited steps. That is, the method possesses at least the recited steps, but does not exclude other steps that are not expressly recited. For example, the method also covers retracting the instrument and/or rotating the mold.

While the present methods may be adaptable to various modifications and alternative forms, specific embodiments have been shown by way of example. However, it should be understood that the present methods are not intended to be limited to the particular forms disclosed. Rather, they are is to cover all modifications, equivalents, and alternatives falling within the scope of the claims.

Moreover, the different aspects of the disclosed methods may be utilized in various combinations and/or independently. Thus the present methods and compositions are not limited to only those combinations disclosed, but rather may include other combinations. Those of skill in the art will understand that numerous other modifications may be made to the disclosed methods and compositions, and that such similar substitutes and modifications are within the scope of the claims.

Figure 1:
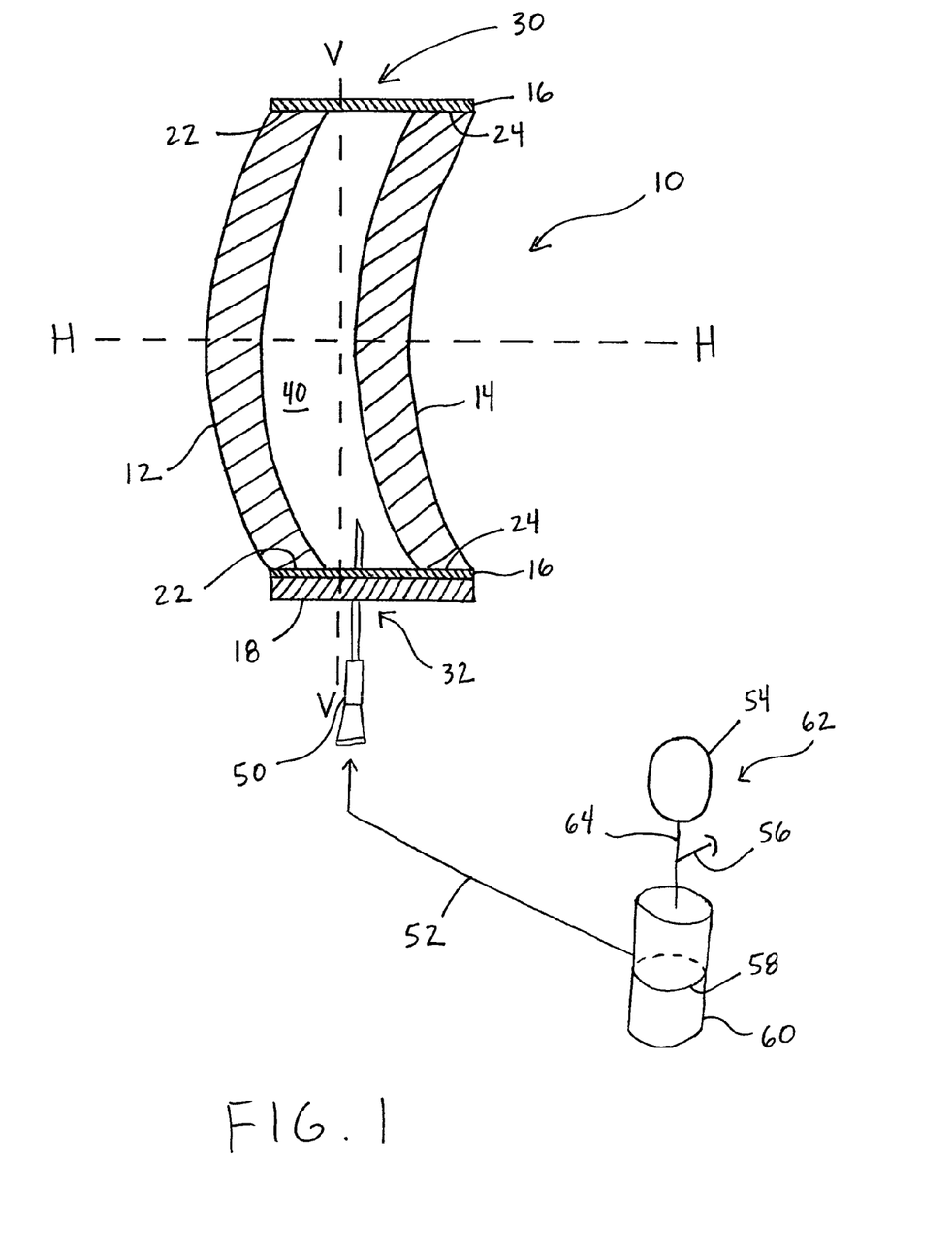
FIG. 1 is a cross-sectional view of a mold and a pumping system.

FIG. 1 shows a mold 10 in cross-section. Mold 10 includes two mold pieces—a front mold piece 12 and a back mold piece 14. The two mold pieces may be made of any suitable material such as, for example, glass. More specifically, mineral glass may be used for these mold pieces. Other suitable mold piece materials are metal and plastic. The facing inside surfaces of front and back mold pieces 12 and 14 are a negative image of the required surfaces of the optical lens to be molded. As shown in FIG. 1, the two molding pieces are intended for molding a minus ophthalmic lens.

Front and back mold pieces 12 and 14 may be characterized as a portion of a mold. This follows because, as those skilled in the art will understand, there are other parts (not shown) that may be used with what is shown in FIG. 1 in the practice of using mold 10. Such additional parts may include, for example, a frame in which front and back mold pieces 12 and 14 sit during use.

Mold 10 has a top, generally designated by 30, and a bottom, generally designated by 32.

Front mold piece 12 has an edge 22, and back mold piece 14 has an edge 24. As shown in FIG. 1, closure member 16 is attached to a portion of mold 10 (e.g., to front and back mold pieces 12 and 14). Suitable closure members may be characterized as sleeves (e.g., a rubber gasket), and may be disposed around and engaged with the edges of the front and back mold pieces of mold 10. For example, FIG. 1 shows closure member 16 disposed around and attached to edges 22 and 24 of front and back mold pieces 12 and 14. Closure member 16 may also be a strip that is wrapped around the edges of the mold pieces. A machine may be used to effect this. For example, a machine may be configured to hold mold pieces 12 and 14 in a fixed position, and wrap closure member 16 around edges 22 and 24 while mold pieces 12 and 14 are maintained in the fixed position, effectively attaching closure member 16 to edges 22 and 24.

Closure member 16 may comprise any suitable material, including, for example, an adhesive synthetic material or a heat-shrink synthetic material. One example of a suitable closure member is Niponzeon Sliontec 6263, which is commercially available from Sliontec Corporation (3819 Noborito, Tama-ku, Kawasaki, Kanagawa, 214-0014 Japan). Another example of a suitable material for closure member 16 is Barnier tape reference no. 8055 (produced by Scapa Tapes France; 9-11 Rue Edouard Branly 26000 Valence). 3M produces tapes that are also suitable for closure member 16—3M Composite Bonding Tape 8905 and 3M Polyester Film Tape 8412 (available from 3M's Industrial Tape and Specialties Division, St. Paul, Minn.).

Mold 10 also includes sealing material 18, which is positioned near bottom 32 and attached to closure member 16. By "near bottom 32," we mean either at bottom 32 or close to bottom 32. All the present uses of "near" carry the same meaning: at or close to. A description of a suitable method for testing the suitability of materials to serve as sealing material 18 shown in FIG. 1 is included below in the example. Some suitable sealing materials are also provided below as the results of an experiment.

Together, front and back mold pieces 12 and 14 and closure member 16 define cavity 40, which may be characterized as a molding cavity. Cavity 40 comprises an upper half and a lower half, which halves may be symmetrically arranged about a central horizontal axis HH of mold 10. As shown in FIG. 1, mold 10 may be held vertically or at least substantially vertically, or on edge, with cavity 40 extending in the direction of a vertical axis VV, which may be oriented perpendicular to central horizontal axis HH.

Consistent with certain of the present methods, which may be characterized as methods for molding optical lenses, after mold 10 is provided and preferably oriented vertically (as shown in FIG. 1), instrument 50 may be used to puncture sealing material 18 and closure member 16, thereby forming an opening (e.g., a hole) in sealing material 18, and more specifically in sealing material 18 and in closure member 16. In one embodiment, instrument 50 may puncture sealing material 18 and closure member 16 at the lowest point of mold 10. As shown in FIG. 1, instrument 50 may be a needle, such as a hypodermic needle. However, any hollow structure (such as tubing) with a sharp tip may be used for instrument 50; preferably, the angle of the tip should be between 10 and 80 degrees.

A polymerizable composition may then be introduced into cavity 40 through instrument 50. Suitable polymerizable compositions include polymerizable synthetic compositions, such as room temperature compositions and, in particular, fast curing compositions. Examples of fast curing compositions are compositions that cures within 10 minutes or less, 7 minutes or less, or 4 minutes or less at room temperature. An example of a composition that cures in 10 minutes or less at room temperature is disclosed in U.S. Pat. No. 5,973,098, which is incorporated by reference. Polymerizable compositions that are particularly well-suited for use with certain of the present methods include those that tend to shrink minimally (e.g., preferably less than 15% by volume, and more preferably in the range of 0 to 8% by volume) because minimal shrinkage will lessen the chance of bubble formation during either filling of the mold or curing of the composition. Other suitable polymerizable compositions that may be used are the acrylic ultra-violet polymerizable compositions provided in U.S. Pat. Nos. 5,741,831 and 5,702,825, both of which are incorporated by reference.

The introduction of a polymerizable composition into cavity 40 through instrument 50 may be facilitated through the use of a pumping system. One embodiment of a suitable pumping system is shown in FIG. 1. Pumping system 62 includes a pressure source 54 on the upstream side of a storage vessel 60 containing the polymerizable molding material 58. Storage vessel 60 may be connected by a conduit 52 to instrument 50 and applied like a filling nozzle. Pressure source 54 may be, for example, a compressed air vessel, and may be connected to storage vessel 60 by a conduit 64 controlled by valve 56. Valve 56 may be opened and controlled to obtain the desired flowrate of polymerizable molding material 58 into cavity 40 progressively from bottom 32 of mold 10. Valve 56 may be adjusted such that cavity 40 is fed continuously with polymerizable molding material 58. For example, valve 56 may be adjusted such that polymerizable molding material 58 flows smoothly into cavity 40. A smooth flow may be achieved at a volumetric rate of between 0.4 and 1.3 milliliters/minute.

Figure 2:
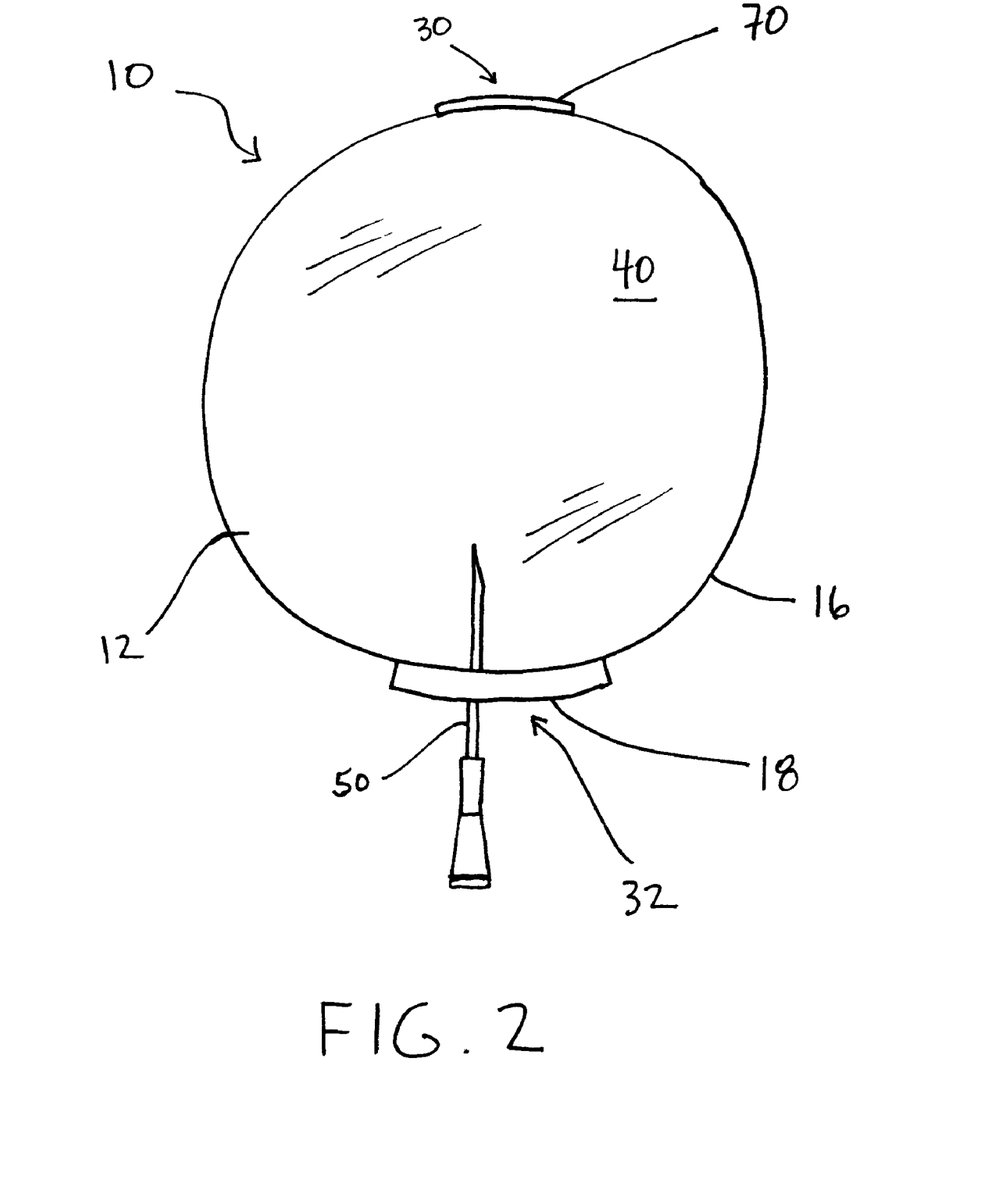
FIG. 2 is a front view of a mold.

FIG. 2 is a front view of mold 10. As shown in FIG. 2, a piece of vent tape 70 may be positioned near top 30 of mold 10. The piece of vent tape may be attached to closure member 16 and cover an opening in closure member 16. The piece of vent tape may be configured to allow air, but not the polymerizable composition that will fill cavity 40, to pass through it. An example of a suitable material that may be used for vent tape 70 is 3M Venting Tape 394 (available from 3M's Industrial Tape and Specialties Division). A discussion of suitable vent tapes for use with the present methods is found in U.S. patent application Ser. No. 10/212,629, filed Aug. 5, 2002, the inventors of which are James A. Reed and Joseph Boryslawski. This application is incorporated by reference.

After cavity 40 has been completely filled (i.e., filled to the satisfaction of the operator) with the polymerizable composition, instrument 50 may be retracted from cavity 40. In one embodiment, mold 10 may then be rotated. This rotation may occur as soon after instrument 50 is retracted as possible. The rotation may take place by rotating mold 10 about its central horizontal axis HH. The rotation may take place in either a clockwise or a counterclockwise direction. The degree of rotation may range from between 0° to 180°, but preferably is 90° or at least approximately 90°. "Approximately" and "substantially" are both defined as at least close to a given value (e.g., preferably within 10% of, more preferably within 1% of, and most preferably within 0.1% of). Thus, "approximately 90 degrees" includes any angle from 81 to 99 degrees, including 81, 82, 83, 84, 85, 86, 87, 88, 89, 90, 91, 92, 93, 94, 95, 96, 97, 98, and 99 degrees, as well as any derivative of any angle between 81 and 99 degrees. "Substantially vertically" includes vertically.

Figure 3:
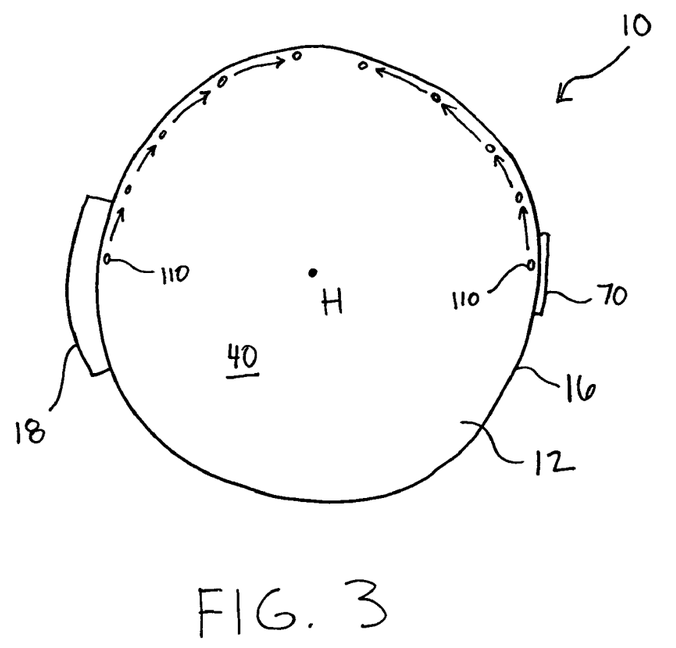
FIG. 3 is a front view of a mold that has been rotated, and shows the migration pattern of bubbles formed within the polymerizable composition.

The purpose of the rotation is to reduce or eliminate the possibility that any microbubbles that form within the polymerizable composition after entering the same through the openings in sealing material 18 and closure member 16 that remain after instrument 50 is removed, or through the openings in piece of vent tape 70 and closure member 16 (which openings are designed to vent the gas displaced by the polymerizable composition during the filling process) migrate to the central portion of the lens. For example, as shown in FIG. 3, by rotating mold 10 in this fashion, any bubbles 110, which may be microbubbles, that form within the polymerizable composition after rotation will migrate along the outermost edge of the polymerizable composition (i.e., near closure member 16) and up to the new top of mold 10, as shown by the arrows. In this way, bubbles that form in a fast-curing polymerizable composition will remain at the edges of the resulting lens, and will not foul the utility of the central portion of the lens, which is the portion used as the final lens in a pair of eyeglasses.

Figure 4:
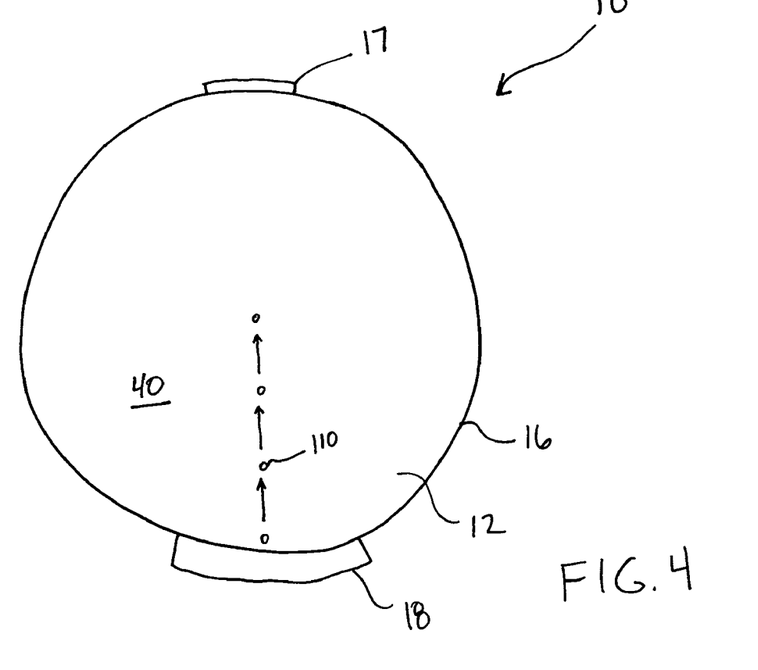
FIG. 4 is a front view of a mold that has not been rotated, and shows the migration pattern of a bubble formed within the polymerizable composition.

By contrast, as shown in FIG. 4, the bubble 110 that forms near the openings remaining in sealing material 18 and closure member 16 in the polymerizable composition in mold 10 could migrate to or near the center of the lens as it is curing or being polymerized and remain there once the lens is cured, thereby rendering the cured lens useless. This problem is especially acute in instances where the polymerizable composition cures rapidly, such as on the order of 10 minutes or less at room temperature.

After polymerization is complete, mold 10 may be disassembled. Because a sealing material is utilized instead of a valve as disclosed in U.S. patent application Ser. No. 09/814,318, no special machining is required to remove a valve from the finished lens. This results in a savings of time and money.

Another of the present methods is a method for evaluating, or testing, the self-sealing nature of a piece of material. The method includes providing a cavity that has an opening over which a piece of material, such as sealing material, is positioned. The cavity may take the form, for example, of the space within a glass tube and the opening may be positioned near the bottom of the tube. The cavity may be partially filled with a liquid, such as water. The piece of material may be punctured with an instrument. The force that it takes to puncture the piece of material may be recorded via a load cell positioned on the instrument. The instrument may be driven with a robotic arm. The recording may take place on a computer with an acquisition card. Suitable forces for puncturing the piece of material being tested include those at or below 30 Newtons (N). A vacuum may be applied to the cavity through, for example, a conduit communicating with the cavity near, for example, the top of cavity. The vacuum may be applied after the instrument—which may, as in the example described above, comprise a needle (such as a hypodermic needle)—is retracted from the cavity. The vacuum may be applied using a venturi and adjusted using a vacuum balance valve. The opening left by the instrument in the piece of material should reduce in size in those materials suitable for use as sealing materials once the instrument is retracted. During the testing, the value of the vacuum (e.g., in inches of mercury) should be noted when, or approximately when, the first microbubble forms near the opening left by the instrument in the piece of material. That vacuum value may then be translated to a pressure value, which is one manner of noting a pressure. Alternatively, a pressure may be noted directly, without the translation from a vacuum value. The best results are obtained when the pressure at which the first bubble forms around gas (such as air) that enters the liquid in the cavity is low.

Some characteristics of suitable sealing materials include, in one embodiment, the following: good adhesion to the closure member; the ability to be pierced by an instrument with less than 30 N of force; resilience resulting in the material sealing quickly after piercing such that leakage and spillage are minimized or avoided; the ability to withstand a vacuum (i.e., low pressure) and permit only minimal or no gas to pass through the opening formed by the instrument.

The following example is included to demonstrate a specific embodiment of the present testing methods. It should be appreciated by those of skill in the art that the techniques disclosed in the example that follows represent techniques discovered by the inventors to function in the practice of the present testing methods, and thus can be considered to constitute a specific mode for their practice. However, those of skill in the art should, in light of this disclosure, appreciate that many changes can be made in the specific embodiment that is disclosed, and still obtain a like or similar result without departing from the scope of the present testing methods.

EXAMPLE 1

Figure 5A:
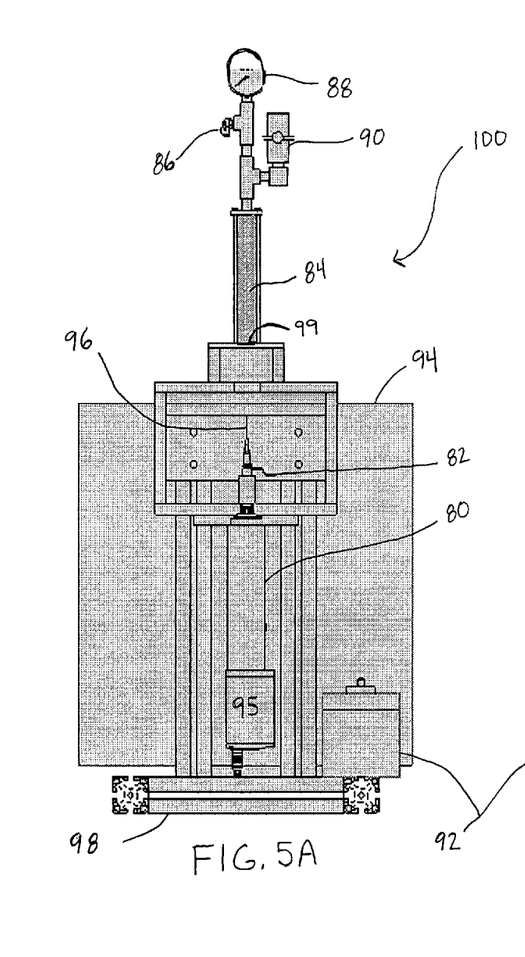
FIGS. 5A and 5B are front and side views, respectively, of a testing system used to test pieces of material to determine their suitability for use as sealing materials.
Figure 5B:
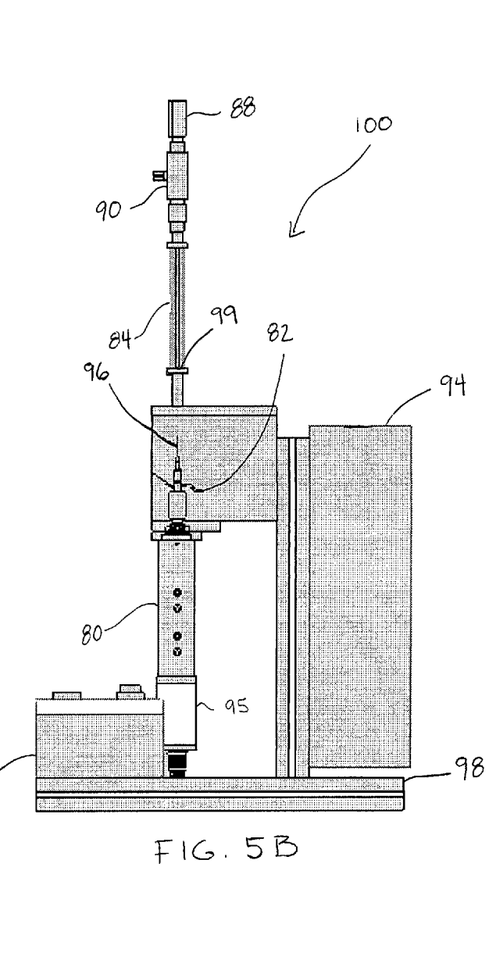

In order to enable the inventors to screen materials for use as sealing materials, the test set-up shown in FIGS. 5A and 5B was created. As shown in FIG. 5A, testing system 100 includes glass site tube 84, which is 6 inches long, has an outer diameter of 0.625 inches and an inner diameter of 0.500 inches. The glass tube permitted the testers to view the water level within the tube (i.e., within the cavity) such that those materials that were inefficient at self-sealing would be apparent (e.g., because the water would leak out and the water level would drop). In addition, the glass tube permitted the testers to view the formation of any bubbles in cases in which the material being tested was not sealing completely against the vacuum applied. The glass tube had an opening at its bottom end, which was covered with a piece of the material to be tested 99.

The piece of material to be tested was pierced by needle 96, which was a 16-gauge by 1-inch Becton-Dickinson insertion needle. Needle 96 was advanced and retracted using cylinder 80, which was an Intelligent Actuator Inc. (2690 W. 237$^{th}$ St., Torrance, Calif. 90505) Robot Cylinder, model RCP-RSA1-H-100-S. A load cell 82, which was a GS sensor 2-pound, model XFTC101-M5M-2 (available from GS Sensors Inc.; 24 Rue Des Dames B17 78340 Les Clayes Sous Bois France), was attached to needle 96 to record the load while piercing.

As shown in FIG. 5A, a vacuum inlet fitting 86, to which a vacuum source was connected, was in communication with tube 84. Vacuum gauge 88 for measuring a value of the vacuum applied to tube 84 (in inches of mercury) was in communication with vacuum inlet fitting 86. Vacuum balance valve 90 was in communication with the vacuum source, for adjusting the vacuum applied to tube 86.

An electric panel box 94 contained a 24-volt DC power supply for powering controller 95, which comprised an Intelligent Actuator Inc. controller model RCP-C. Using operator control box 92, a tester could actuate controller 95 (in preset fashion if desired) to advance and retract needle 82 using cylinder 80. All of these components were supported by frame structure 98.

To carry out the testing method, different pieces of material were attached to the bottom of tube 84, thereby covering its opening. Tube 84 was then filled partially with water. An operator then caused needle 96 to advance such that the tip of the needle pierced the piece of material. This was done by actuating a button on control box 92. The load force used by cylinder 80 to cause needle 96 to pierce the piece of material was sensed by load cell 82, and recorded on computer with an acquisition card. In all cases, the value of the piercing load force was less than 30 N. The speed of penetration and the depth of penetration were fixed at 20 millimeters per second and 10 millimeters, respectively. The needle was then retracted by another button on control box 92.

An operator tracked any water loss for 10 minutes. Any tape that leaked at atmospheric pressure was characterized as failing the test. A vacuum was then applied using a series ZH venturi made by SMC Corporation of America (Indianapolis, Ind.) and adjusting vacuum balance valve 90 to gradually increase the value of the vacuum in inches of mercury. The vacuum value was read on vacuum gauge 88. As the vacuum was adjusted, an operator checked for microbubbles forming at the puncture point of needle 96. For a given piece of material, the test was stopped when the first microbubble was seen; at this time, or at approximately this time, the value of the vacuum was also recorded.

The results of this testing appear below in Table 1. The vacuum values that were noted during the test have been converted to pressure values. The different materials screened for use as sealing materials are described by company and model. The column heading "Lowest pressure without bubble apparition (mm Hg)" means the lowest pressure in tube 84 that was noted prior to the formation of a microbubble in the water in tube 84 (note that normal atmospheric pressure is ~760 mm Hg).

TABLE 1

|   | Company | Model | Thickness (mm) | Structure | Leaking after needle retraction | Lowest pressure without bubble apparition (mm Hg) |
|---|---|---|---|---|---|---|
| 1 | Secon Rubber and Plastics | PN4701-40 | 3.18 | Foam | Yes | 735 |
| 2 | Kapco Co. | VHB4910 | 3.18 | Foam | Yes | 735 |
| 3 | Industrial Tape | ⅛" foam tape | 3.18 | Foam | Yes | 735 |
| 4 | Carolina Tape Co. | ⅛" foam tape | 3.18 | Foam | Yes | 735 |
| 5 | Saint-Gobain Co. | N4704 | 3.18 | Foam | Yes | 735 |

TABLE 1-continued

| | Company | Model | Thickness (mm) | Structure | Leaking after needle retraction | Lowest pressure without bubble apparition (mm Hg) |
|---|---|---|---|---|---|---|
| 6 | Adchem Corp. | 4423-60 | 3.18 | Foam | Yes | 735 |
| 7 | Saint-Gobain Co. | N4504 | 3.18 | Foam | Yes | 735 |
| 8 | Adhesive Research | Arclad 561 | 6 mils | Non-foam | Yes | 735 |
| 9 | Tape-Rite Co. | closed cell rubber | 3.18 | Foam | Yes | 735 |
| 10 | New Dimension | #3120 W/GRC-700 & RB PSA 1-Side | 3.18 | Foam | Yes | 735 |
| 11 | Stik II Products | ½" foam tape | 12.70 | Foam | Yes | 735 |
| 12 | R.H. Hughes Co. | PH4992 neoprene | 0.79 | Neoprene | No | 735 |
| 13 | 3M Co. Can-Do Tapes | ⅛" foam tape | 3.18 | Foam | Yes | 735 |
| 14 | 3M | VHB 4618 | 0.90 | Foam | Yes | 735 |
| 15 | Tape-Rite Co. Inc. | ⅛" foam tape | 3.18 | Foam | Yes | 735 |
| 16 | Adchem Corp. | ⅛" foam tape | 4.18 | Foam | Yes | 735 |
| 17 | Nott Co. | Silicone 30 Durometer ⅛" thick | 3.18 | Silicone | No | 75 |
| 18 | Nott Co. | Silicone 30 Durometer 1/16" thick | 1.59 | Silicone | No | 630 |
| 19 | Nott Co. | Neoprene 30 Durometer ⅛" thick | 3.18 | Neoprene | No | 75 |
| 20 | Nott Co. | Neoprene 30 Durometer 1/16" thick | 1.59 | Neoprene | No | 75 |
| 21 | 3M | 8300 | 2.00 | Non-foam | No | 735 |
| 22 | Aero Rubber Co. | PN S0034213308 | 3.18 | Rubber | No | 735 |
| 23 | Carolina Tape | ⅛" foam tape | 3.18 | Foam | Yes | 735 |
| 24 | Avery | UHA3099 | 2.00 | Acrylic | No | 735 |
| 25 | 3M | 8500T-0125 | 2.00 | Acrylic | No | 75 |
| 26 | 3M | 8100 | 2.00 | Acrylic | No | 505 |

EXAMPLE 2

A polymerizable composition was prepared from two prepolymers. Different materials were then tested for use as sealing materials in the creation of lenses from the polymerizable composition.

The two pre-polymers were prepared according to following procedure, which is described fully in U.S. patent application Ser. No. 10/012,727, filed Nov. 5, 2001 by Gabriel Keita, Joey O. Obordo, Pamela Anne McClimans, and Yusef Turshani, and which is incorporated by reference:

Part A—NCO

A reactor equipped with a condenser, a thermal probe, and an agitator was charged with a determined amount of xylylene diisocyanate (XDI). The monomer XDI was heated to 115° C. Next, 3-(2-sulfanylethylthio)-2-(2-sulfanlethylthio)propane 1-thiol was introduced and mixed with polyisocyanate in amounts such that the molar ratio of isocyanate functions to the thiol function $\left(\frac{NCO}{SH}\right)$ was 8:1.

The reaction was complete after 3 to 4.5 hours. The final Part A prepolymer with isocyanate end groups had a viscosity at 25° C. of 0.071 Pascal seconds (Pa.s).

Part B—SH Ending

The reactor was charged with a determined amount of 3-(2-sulfanylethylthio)-2-(2-sulfanlethylthio)propane 1-thiol. That monomer was heated to 90° C. Next, xylylene diisocyanate was introduced and mixed with polythiol in amounts such that the molar ratio of thiol functions to the isocyanate function $\left(\frac{SH}{NCO}\right)$ was 8:1.

The reaction was complete after 3 hours. The final Part B prepolymer with thiol end groups was cooled to 35° C. and had a viscosity of 0.543 Pa.s at 25° C.

A catalyst solution was added to 10,000 grams (g) of part B. The catalyst solution was made of the following: 71.88 g of 18-crow-6 ether; 17.97 g of potassium thiocyanate (KSCN); and 119.8 of thioethanol.

Part A and Part B (plus the catalyst solution) were then dispensed through two metering gear pumps at a volume ratio of A/B=1.18. The two parts were then blended together using a dynamic mixer.

After the polymerizable composition was created, a molding cavity created in accordance with cavity 40 in FIG. 1 was filled in the manner shown in FIG. 1. That is, a hypodermic needle was used to puncture, from the bottom, a material attached to a closure member made of Bamier tape reference no. 8055. The polymerizable composition was introduced into the molding cavity at a rate of approximately 2 grams/second. A lens was obtained after 10 minutes at room temperature and one hour of curing at 120° C. The lens was then visually inspected with a high-intensity lamp (an arc lamp) for the presence of bubbles or microbubbles.

This process was used to create many different lenses, and different materials were tested. The results, including the materials used and the number of lenses created, are provided below in Table 2. The vacuum values that were converted to the pressure values provided below were measured using the series ZH venturi identified above in Example 1. The heading "Percentage of lenses with microbubbles" indicates the precentage of lenses created in which microbubbles were formed. As the data in Table 2 shows, there was a good correlation between the "Lowest pressure" values and the precentage of microbubbles found: that is, the lower the pressure value, the lower the precentage of microbubbles found. Certain lenses were rotated 90 degrees after filling as described above, and this even further reduced the percentage of lenses in which microbubbles were formed.

The inventors have found that the materials best suited for use as sealing materials are those that resulted in no more than 10% of lenses with microbubbles, whether the lenses were rotated 90° after filling or not.

Materials capable of withstanding a cavity pressure that is less than or equal to 505 millimeters of mercury or less are examples of materials suitable for use with the present methods. The same is true for materials capable of withstanding a cavity pressure that is less than or equal to: 450 millimeters of mercury or less, 400 millimeters of mercury or less, 350 millimeters of mercury or less, 300 millimeters of mercury or less, 250 millimeters of mercury or less, 200 millimeters of mercury or less, 150 millimeters of mercury or less, and 100 millimeters of mercury or less. Materials capable of withstanding pressures greater than or equal to 75 millimeters of mercury and less than or equal to 505 millimeters of mercury also are suitable for use with the present methods. The same is true of materials capable of withstanding pressures: greater than or equal to 100 millimeters of mercury and less than or equal to 450 millimeters of mercury, greater than or equal to 150 millimeters of mercury and less than or equal to 400 millimeters of mercury, greater than or equal to 200 millimeters of mercury and less than or equal to 350 millimeters of mercury, and greater than or equal to 250 millimeters of mercury and less than or equal to 300 millimeters of mercury.

It is believed that, based on the test results above in Tables 1 and 2, materials capable of withstanding pressures greater than or equal to 10 millimeters of mercury and less than or equal to 505 millimeters of mercury also are suitable for use with the present methods.

We claim:

1. A method comprising:
   providing a cavity defined by at least a portion of a mold and a closure member attached to the portion of the mold, the portion of the mold being oriented substantially vertically and having a top and a bottom, and a sealing material being positioned near the bottom and attached to the closure member;
   puncturing the sealing material and the closure member with an instrument near the bottom, the puncturing creating an opening in the sealing material;
   introducing a polymerizable composition into the cavity through the instrument;
   retracting the instrument from the cavity after the introducing, where the opening in the sealing material has a size,

TABLE 2

| | Material | 90° rotation after filling | Total number of lenses created | Percentage of lenses with microbubbles | Lowest pressure without bubble apparition (mm Hg) | Leaking after needle retraction |
|---|---|---|---|---|---|---|
| 1 | 3M 8500T-0125 | No | 150 | 9 | 75 | No |
| 2 | 3M 8100 | No | 625 | 22.3 | 505 | No |
| 3 | Nott Co Silicone 30 Durometer 1/16" thick | No | 225 | 28 | 630 | No |
| 4 | Avery UHA3099 | No | 775 | 28 | 735 | No |
| 5 | Aero Rubber Co. PN S0034213308 tape | No | 950 | 37.4 | 735 | No |
| 6 | Aero Rubber Co. PN S0034213308 tape | Yes | 450 | 3.3 | 735 | No |
| 7 | 3M 8500T-0125 | Yes | 3000 | 0 | 75 | No | and the sealing material possesses a self-sealing property that reduces the size of the opening after the instrument is retracted; and prior to any polymerizing of the polymerizable composition, rotating the portion of the mold approximately 90 degrees about a horizontal axis passing through the portion of the mold.

2. The method of claim 1, where the sealing material is made from a piece of sealing material that will yield a cavity pressure that is greater than or equal to 10 millimeters of mercury and less than or equal to 505 millimeters of mercury when tested by:
providing a cavity having at least one opening over which the piece of sealing material is positioned, the cavity containing liquid;
puncturing the piece of sealing material with an instrument, thereby creating a sealing material opening for a period of time;
applying a vacuum to the cavity; and
noting the cavity pressure approximately when a first bubble forms around gas entering the liquid through the sealing material opening from outside the cavity.

3. The method of claim 1, where the sealing material is made from a piece of sealing material that will yields a cavity pressure that is greater than or equal to 75 millimeters of mercury and less than or equal to 505 millimeters of mercury when tested by:
providing a cavity having at least one opening over which the piece of sealing material is positioned, the cavity containing liquid;
puncturing the piece of sealing material with an instrument, thereby creating a sealing material opening for a period of time;
applying a vacuum to the cavity; and
noting the cavity pressure approximately when a first bubble forms around gas entering the liquid through the sealing material opening from outside the cavity.

4. The method of claim 1, where the rotating includes rotating the portion of the mold 90 degrees about a horizontal axis passing through the portion of the mold.

5. The method of claim 1, further comprising:
polymerizing the polymerizable composition to form an optical lens.

6. The method of claim 1, where the cavity is further defined by a piece of vent tape positioned near the top and attached to the closure member.

7. The method of claim 6, where the piece of vent tape is configured to allow air, but not the polymerizable composition, to pass through the piece of vent tape.

8. The method of claim 1, where the portion of the mold oriented substantially vertically comprises at least two mold pieces having edges, and the closure member is attached to the edges of the at least two mold pieces.

9. The method of claim 1, further comprising:
polymerizing the composition to form an optical lens within four minutes.

10. The method of claim 1, further comprising:
polymerizing the composition to form an optical lens within seven minutes.

11. The method of claim 1, further comprising:
polymerizing the composition to form an optical lens within ten minutes to two hours.

12. The method of claim 1, where the sealing material includes silicone.

13. A method for making a lens, the method comprising:
providing a vertically-oriented molding cavity having a top and a bottom and being defined by at least (a) a first mold piece having a concave surface, (b) a second mold piece having a convex surface, and (c) a closure member disposed around and attached to the first and second mold pieces, a sealing material being connected to the closure member and positioned near the bottom;
puncturing the sealing material and the closure material with an instrument near the bottom, the puncturing creating an opening in the sealing material;
introducing a polymerizable composition into the cavity through the instrument;
retracting the instrument from the cavity;
prior to any polymerizing of the polymerizable composition, rotating the molding cavity approximately 90 degrees about a horizontal axis passing through the molding cavity; and
after the rotating, polymerizing the polymerizable composition to form the lens;
where the opening in the sealing material has a size that reduces after the instrument is retracted.

14. The method of claim 13, where the sealing material is made from a piece of sealing material that will yields a cavity pressure that is greater than or equal to 10 millimeters of mercury and less than or equal to 505 millimeters of mercury when tested by:
providing a cavity having at least one opening over which the piece of sealing material is positioned, the cavity containing liquid;
puncturing the piece of sealing material with an instrument, thereby creating a sealing material opening for a period of time;
applying a vacuum to the cavity; and
noting the cavity pressure approximately when a first bubble forms around gas entering the liquid through the sealing material opening from outside the cavity.

15. The method of claim 13, where the sealing material is made from a piece of sealing material that will yields a cavity pressure that is greater than or equal to 75 millimeters of mercury and less than or equal to 505 millimeters of mercury when tested by:
providing a cavity having at least one opening over which the piece of sealing material is positioned, the cavity containing liquid;
puncturing the piece of sealing material with an instrument, thereby creating a sealing material opening for a period of time;
applying a vacuum to the cavity; and
noting the cavity pressure approximately when a first bubble forms around gas entering the liquid through the sealing material opening from outside the cavity.

16. A method comprising:
providing a cavity defined by at least a portion of a mold and a closure member attached to the portion of the mold, the portion of the mold being oriented substantially vertically and having a top and a bottom, and a sealing material being positioned near the bottom and attached to the closure member;
puncturing the sealing material and the closure member with an instrument near the bottom, the puncturing creating an opening in the sealing material;
introducing a polymerizable composition into the cavity through the instrument;
retracting the instrument from the cavity after the introducing, where the opening in the sealing material has a size, and the sealing material possesses a self-sealing property that reduces the size of the opening after the instrument is retracted; and after the retracting, and prior to any polymerizing of the polymerizable composition, rotating the portion of the mold approximately 90 degrees about a horizontal axis passing through the portion of the mold to reduce or eliminate the possibility that any microbubbles that form within the polymerizable composition after entering the polymerizable composition through the opening in the sealing material and that remain after the instrument is retracted migrate to the central portion of the mold.

17. The method of claim 16, where the sealing material is made from a piece of sealing material that will yield a cavity pressure that is greater than or equal to 10 millimeters of mercury and less than or equal to 505 millimeters of mercury when tested by:
   providing a cavity having at least one opening over which the piece of sealing material is positioned, the cavity containing liquid;
   puncturing the piece of sealing material with an instrument, thereby creating a sealing material opening for a period of time;
   applying a vacuum to the cavity; and
   noting the cavity pressure approximately when a first bubble forms around gas entering the liquid through the sealing material opening from outside the cavity.

18. The method of claim 16, where the sealing material is made from a piece of sealing material that will yields a cavity pressure that is greater than or equal to 75 millimeters of mercury and less than or equal to 505 millimeters of mercury when tested by:
   providing a cavity having at least one opening over which the piece of sealing material is positioned, the cavity containing liquid;
   puncturing the piece of sealing material with an instrument, thereby creating a sealing material opening for a period of time;
   applying a vacuum to the cavity; and
   noting the cavity pressure approximately when a first bubble forms around gas entering the liquid through the sealing material opening from outside the cavity.

19. The method of claim 16, where the rotating includes rotating the portion of the mold 90 degrees about a horizontal axis passing through the portion of the mold.

20. The method of claim 16, further comprising:
   polymerizing the polymerizable composition to form an optical lens.

21. The method of claim 16, where the cavity is further defined by a piece of vent tape positioned near the top and attached to the closure member.

22. The method of claim 21, where the piece of vent tape is configured to allow air, but not the polymerizable composition, to pass through the piece of vent tape.

23. The method of claim 16, where the portion of the mold oriented substantially vertically comprises at least two mold pieces having edges, and the closure member is attached to the edges of the at least two mold pieces.

24. The method of claim 16, further comprising:
   polymerizing the composition to form an optical lens within four minutes.

25. The method of claim 16, further comprising:
   polymerizing the composition to form an optical lens within seven minutes.

26. The method of claim 16, further comprising:
   polymerizing the composition to form an optical lens within ten minutes to two hours.

27. The method of claim 16, where the sealing material includes silicone.

\* \* \* \* \*

UNITED STATES PATENT AND TRADEMARK OFFICE
CERTIFICATE OF CORRECTION

| | | |
|---|---|---|
| PATENT NO. | : 7,820,085 B2 | Page 1 of 1 |
| APPLICATION NO. | : 10/696503 | |
| DATED | : October 26, 2010 | |
| INVENTOR(S) | : Gabriel Keita et al. | |

It is certified that error appears in the above-identified patent and that said Letters Patent is hereby corrected as shown below:

In title page, item (73) Assignee, delete "Essilor International" and insert --Essilor International (Compagnie Generale d'Optique)-- therefor.

In claim 14, column 14, line 21, delete "yields" and insert --yield-- therefor.

In claim 15, column 14, line 36, delete "yields" and insert --yield-- therefor.

In claim 18, column 15, line 26, delete "yields" and insert --yield-- therefor.

Signed and Sealed this
Fifth Day of April, 2011

David J. Kappos
*Director of the United States Patent and Trademark Office*